United States Patent [19]
Rasidescu et al.

[11] Patent Number: 6,092,877
[45] Date of Patent: Jul. 25, 2000

[54] ALL TERRAIN VEHICLE WITH DUAL HYDRAULIC BRAKE SYSTEM

[75] Inventors: Mihai Rasidescu, Warroad, Minn.; William Wood, Camarillo, Calif.

[73] Assignee: Polaris Industries Inc., Minneapolis, Minn.

[21] Appl. No.: 09/255,616

[22] Filed: Feb. 22, 1999

Related U.S. Application Data

[63] Continuation of application No. 09/128,065, Aug. 3, 1998.

[51] Int. Cl.$^7$ .................................................. B60T 13/00
[52] U.S. Cl. ......................... 303/9.61; 188/72.5; 188/345
[58] Field of Search ................................ 188/72.4, 72.5, 188/345; 303/9.61, 9.64, 9.65

[56] References Cited

U.S. PATENT DOCUMENTS

| | | | |
|---|---|---|---|
| 3,473,634 | 10/1969 | Strifler et al. | 188/152 |
| 3,486,591 | 12/1969 | Scheffler | 188/106 |
| 3,502,181 | 3/1970 | Lepelletier | 188/152 |
| 3,601,233 | 8/1971 | Marschall et al. | 188/345 |
| 3,750,857 | 8/1973 | Marschall et al. | 188/345 |
| 3,752,272 | 8/1973 | Ooka | 188/345 |
| 3,868,001 | 2/1975 | Yokoi | 188/345 |
| 3,885,392 | 5/1975 | Haraikawa | 60/581 |
| 3,999,807 | 12/1976 | Haraikawa | 303/6 R |
| 4,024,932 | 5/1977 | Fay | 188/345 |
| 4,161,239 | 7/1979 | Karasudani | 188/106 P |
| 4,494,800 | 1/1985 | Hayashi | 303/9.64 |
| 4,598,954 | 7/1986 | Hayashi | 188/106 P |
| 5,036,960 | 8/1991 | Schenk et al. | 188/346 |
| 5,219,211 | 6/1993 | Tsuchida et al. | 303/9.64 |
| 5,273,346 | 12/1993 | Tsuchida et al. | 303/9.64 |
| 5,363,943 | 11/1994 | Iwashita et al. | 188/72.5 |
| 5,372,408 | 12/1994 | Tsuchida et al. | 303/9.64 |
| 5,544,946 | 8/1996 | Toyoda et al. | 303/9.64 |
| 5,564,534 | 10/1996 | Toyoda et al. | 303/9.64 |
| 5,620,237 | 4/1997 | Iwashita et al. | 303/9.64 |
| 5,971,499 | 10/1999 | Pape et al. | 303/9.61 |

Primary Examiner—Robert J. Oberleitner
Assistant Examiner—Robert A. Siconolfi
Attorney, Agent, or Firm—Fredrikson & Byron, P.A.

[57] ABSTRACT

An all terrain vehicle (ATV) with a dual hydraulic brake system. The brake system includes a first master cylinder, a pair of front hydraulic brake units, each one being associated with one of the ATV's front wheels, a rear brake unit associated with the ATV's rear wheels, a hand-operable brake lever mounted to the handlebars and operatively connected to the first master cylinder, and hydraulic linking the first master cylinder to the brake units so that when the brake lever actuates the first master cylinder brakes are applied to both the front and the back wheels of the ATV. A second master cylinder is connected to a second hand or foot-operable brake lever carried by the chassis near one of the footrests. Hydraulic connections link the second master cylinder to only the rear brake unit so that operation of the second brake lever actuates only the rear brake. The rear brake unit preferably is a disc brake that includes a caliper body and a stepped piston disposed within a stepped bore formed in the caliper body. The stepped piston and the stepped bore together defining two separate hydraulic fluid chambers. The first master cylinder is connected to one of the hydraulic fluid chambers and the second master cylinder is connected to the other hydraulic fluid chamber so that the piston can be actuated independently by either master cylinder, thus permitting the rear brake to be applied without activating the front brakes of the ATV.

15 Claims, 4 Drawing Sheets

ALL TERRAIN VEHICLE WITH DUAL HYDRAULIC BRAKE SYSTEM

RELATED APPLICATIONS

This application is a continuation of U.S. Pat. Application Ser. No. 09/128,065, filed Aug. 3, 1998, the contents of which are hereby incorporated by reference.

TECHNICAL FIELD

The invention relates to all terrain vehicles (ATV's), and, in particular, to ATV's having hydraulic brake systems.

BACKGROUND OF THE INVENTION

All terrain vehicles (ATV's) have become very popular for both recreational and utility purposes. ATV's are off-road vehicles characterized by having four wheels (two front and two rear) with low pressure tires, handlebars connected to the front wheels for steering, a straddle-type seat designed for a single rider, laterally extending footrests on opposite sides of the vehicle, and an engine and transmission located generally beneath the straddle-type seat and substantially between the footrests. Typically ATV's are not wider than about 50 inches-most commonly about 44–48 inches in overall width. The transmission typically is connected by a suitable drive train to the rear wheels. In many applications, it is desirable to have all four wheels driven by the engine. Four wheel drive ATV's typically have one drive train connecting the transmission to the rear wheels and a separate drive train connecting the transmission to the front wheels.

ATV's desirably include a braking system capable of braking all four wheels. Typically the braking system includes a separate disc brake on each front wheel and a disc brake on the generally rigid axle carrying the rear wheels (though on ATV's having the rear wheels mounted on independent suspensions, separate brake units may be provided for each rear wheel). A master cylinder, typically operated by a handlebar-mounted lever, is hydraulically connected to each of the disc brake calipers so that actuation of the lever simultaneously actuates all of the brake calipers, providing even braking of all of the ATV's wheels.

In some circumstances, however, it is desirable to permit actuation of the rear brakes without actuating the front brakes. For this purpose another brake lever—hand or foot actuated—is connected through a mechanical linkage (such as a cable) to the rear brake caliper. This mechanical linkage therefore bypasses the hydraulic system -;while permitting the rear brakes to be applied independent of the front brakes.

Because mechanical linkages typically require periodic adjustment as the brake pads wear, however, some manufacturers have utilized a second, separate rear caliper on the rear brake rotor, the second caliper being actuated by a second brake lever. The introduction of an additional caliper, however, adds significant cost to the braking system, as well as additional weight to the vehicle.

SUMMARY OF THE INVENTION

The invention provides an all terrain vehicle with a dual hydraulic brake system that solves these problems without adding significant cost or weight to the vehicle. As indicated above, the all terrain vehicle includes a chassis carrying a straddle-type seat which is sufficiently narrow to be straddled by a rider, a pair of front wheels mounted to the chassis, and handlebars connected to the front wheels for steering the vehicle. The vehicle also includes a pair of rear wheels mounted to the chassis, a laterally extending footrest on each side of the chassis, and an engine carried by the chassis, the engine being connected to a drive train supplying motive power to at least some of the wheels.

The dual hydraulic brake system includes a first master cylinder, a pair of front hydraulic brake units, each front brake unit being associated with one of the front wheels of the ATV, a rear brake unit associated with the rear wheels of the ATV, a first hand-operable brake lever mounted to the handlebars of the ATV and operatively connected to the first master cylinder, and hydraulic connections among the first master cylinder and the brake units so that when the first brake lever actuates the first master cylinder all three brake units are actuated to brake both the front wheels and the rear wheels of the ATV. A second master cylinder is also provided, along with a second brake lever that is either foot or hand-operable. The second brake lever is operatively connected to the second master cylinder. Hydraulic connections link the second master cylinder to the rear brake unit (but not the front brake units) so that operation of the second brake lever actuates the second master cylinder which in turn actuates only the rear brake unit to brake the rear wheels of the ATV. The hydraulic connections between the first master cylinder and the rear brake unit are separate from, and sealed from, the hydraulic connections between the second master cylinder and the rear brake unit.

Preferably the rear brake unit is a disc brake which includes a rear disc brake rotor carried by the rear drive axle and a rear disc brake caliper positioned to selectively engage the rear disc brake rotor. The rear disc brake caliper includes a caliper body and a stepped piston disposed within a stepped bore formed in the caliper body, the stepped piston and the stepped bore together defining first and second hydraulic fluid chambers. The first and second chambers are sealed from each other. A first set of hydraulic connections links the first master cylinder to the front brake units and the first hydraulic fluid chamber of the rear brake unit so that when the first brake lever actuates the first master cylinder all three brake units are actuated to brake both the front wheels and the rear wheels of the ATV. A second set of hydraulic connections links the second master cylinder and the second hydraulic fluid chamber of the rear brake unit so that when the second brake lever actuates the second master cylinder the rear brake unit is actuated without actuating the front brake units, thereby braking the rear wheels of the ATV independently of the front wheels. In this fashion independent braking of the rear wheels can be provided without adding a second caliper to the rear brake unit, and without even adding an additional slave cylinder to the rear brake unit.

DETAILED DESCRIPTION OF THE INVENTION

Figure 1:
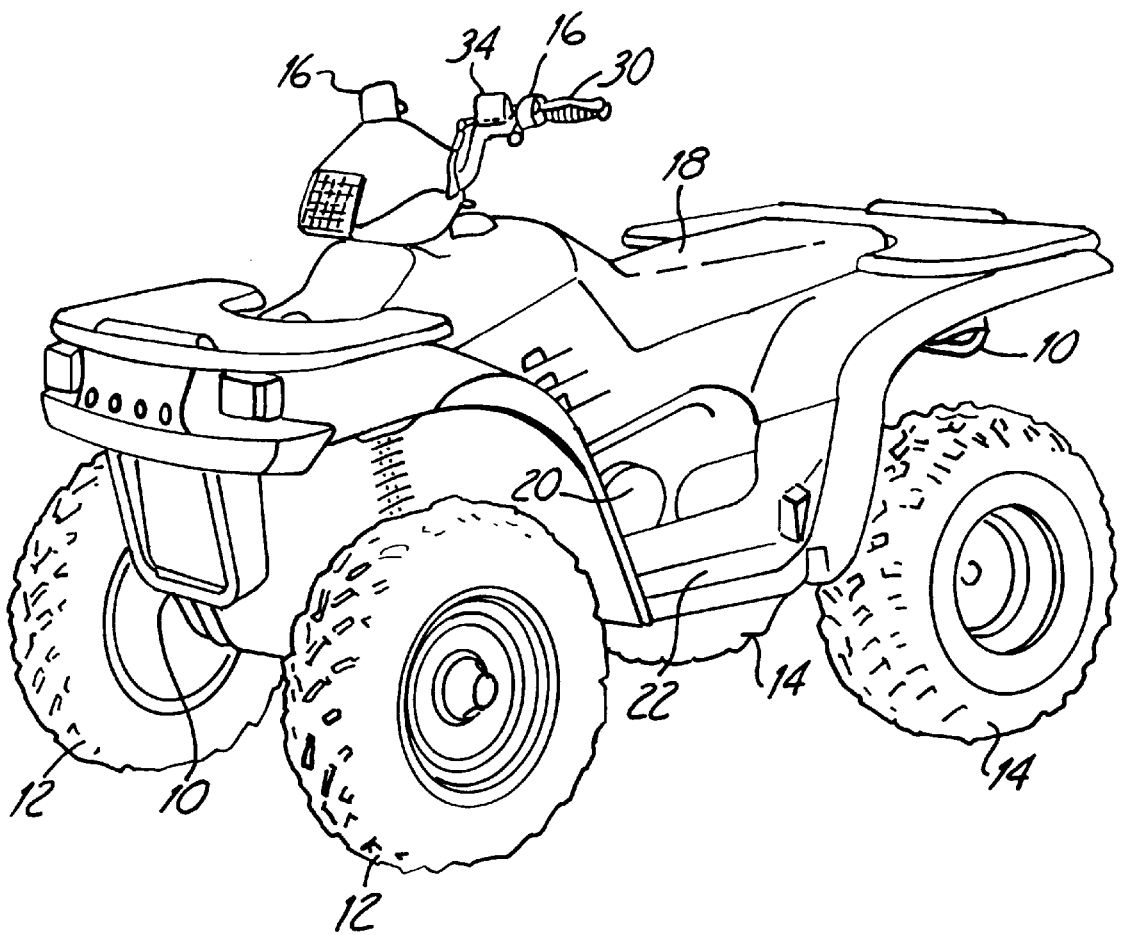
FIG. 1 is a perspective view of an ATV of the invention.

Referring to FIG. 1, an ATV of the invention includes a chassis, designated generally by reference numeral 10, to which the various systems and components of the vehicle are attached. These components include front wheels 12, rear wheels 14 (both having low pressure tires), handlebars 16 connected by a suitable steering linkage to the front wheels 12 for steering the vehicle, and a straddle-type seat 18 designed for a single rider. An engine and a transmission 20 are carried on the chassis 10 generally beneath the straddle-type seat 18 and substantially between a pair footrests (only the left footrest 22 is visible in FIG. 1).

Figure 2:
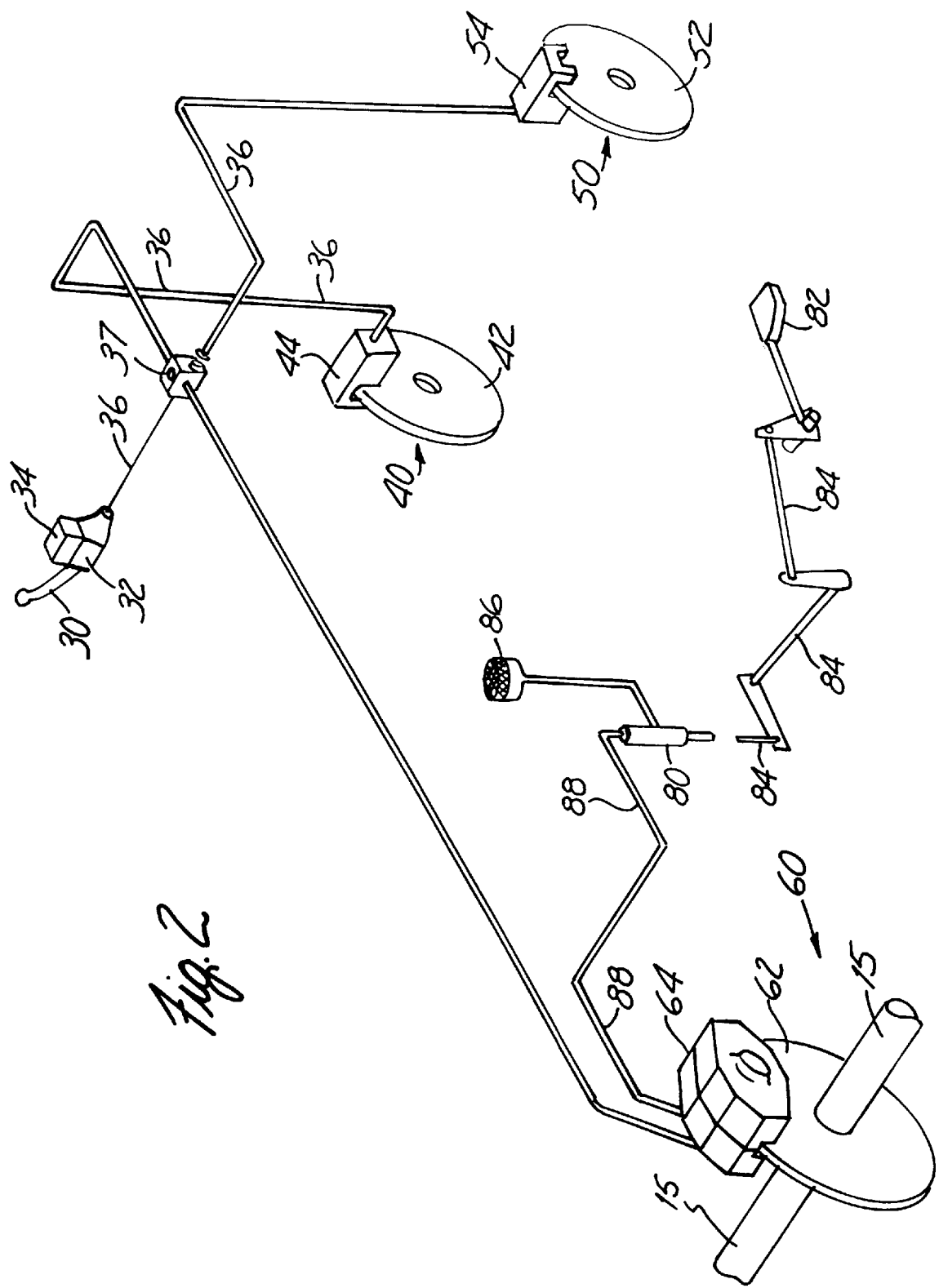
FIG. 2 is a schematic drawing showing the main components of one embodiment of the dual-hydraulic brake system of the invention.

FIG. 2 shows schematically one embodiment of the dual hydraulic brake system of the invention. The system includes a hand-operable brake lever 30 mounted to the handlebars 16 (typically adjacent the left handlebar grip). The brake lever 30 is connected to a first master cylinder 32. A first hydraulic fluid reservoir 34 is associated with the first master cylinder 32, typically being mounted adjacent to and above the first master cylinder 32. A first set of hydraulic lines connects the first master cylinder (typically through a junction box 37) to both of the front brake units 40 and 50 as well as the rear brake unit 60 so that that when the hand-operable brake lever 30 actuates the first master cylinder 32 all three brake units 40, 50 and 60 are actuated to brake both the front wheels 12 and the rear wheels 14 of the ATV.

Figure 3:
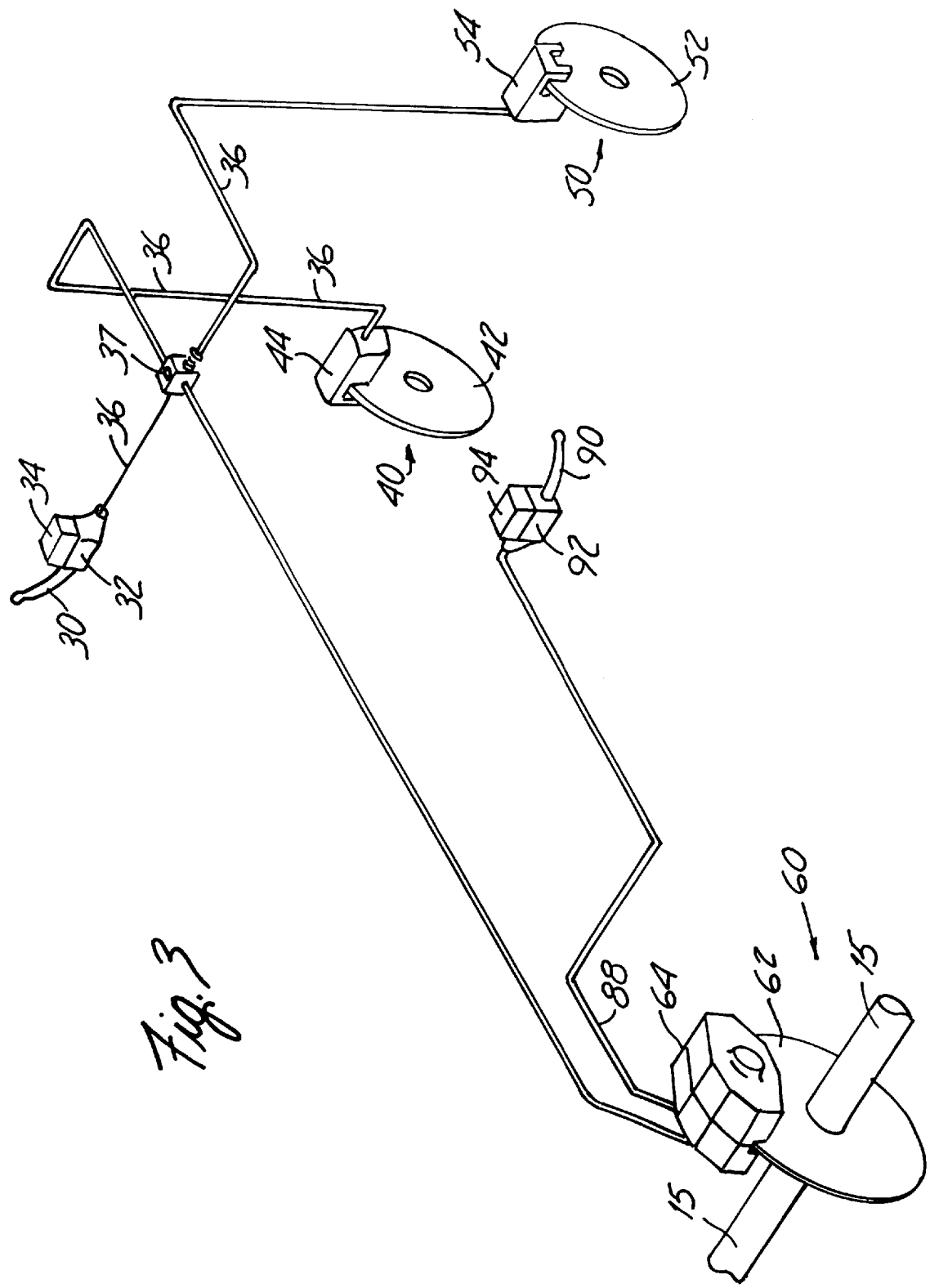
FIG. 3 is a schematic drawing showing the main components of another embodiment of the dual-hydraulic brake system of the invention.

Although any type of suitable brake unit may be employed, desirably the brake units are disc brakes. In FIGS. 2 and 3 each of the front disc brake units is comprised of a rotor 42, 52, typically carried on the associated front wheel 12, and a caliper 44, 54 carried on the chassis 10 adjacent to the associated wheel 12. Such brake units are well known and need not be described in detail. Basically, however, each caliper includes a slave hydraulic cylinder including a piston. When the brake lever 30 is actuated, the master cylinder 32 pushes hydraulic fluid out into the first set of hydraulic lines 36. Since the fluid is substantially non-compressible, it moves the pistons in the calipers 44 and 54, mechanically pinching brake pads (not shown) carried in the calipers against the sides of the rotors 42 and 52 to slow (or stop) the rotation of the rotors 42 and 52 and their associated wheels 12.

In FIGS. 2 and 3 the rear brake unit 60 is also depicted as a disc brake having a rotor 62 mounted to a common rear drive axle 15, which in turn is carried by the chassis. Both rear wheels 14 are connected to this common axle 15, therefore requiring only a single rear brake unit to brake both wheels. For ATV's with a split rear axle and some type of differential between the two axles, two rear brake units may be provided, similar to the two front brake units depicted in FIGS. 2 and 3.

Referring again to FIG. 2, the dual hydraulic brake system of the invention includes a second brake lever—in this embodiment a foot-operable brake lever 82 is carried by the chassis near one of the footrests 22 (typically the right footrest). The foot-operable brake lever 82 is operatively connected to a second master cylinder 80 through a series of suitable mechanical linkages 84. A second hydraulic fluid reservoir 86 is associated with the second master cylinder 80, and a second set of hydraulic lines 88 connects the second master cylinder 80 to just the rear brake unit 60. The first set of hydraulic lines 36 are separate from, and sealed from, the second set of hydraulic lines 88 so that when the foot-operable brake lever 82 actuates the second master cylinder 80 the rear brake unit 60 is actuated without actuating the front brake units 40 and 50, thereby braking the rear wheels 14 of the ATV independently of the front wheels 12.

Figure 4:
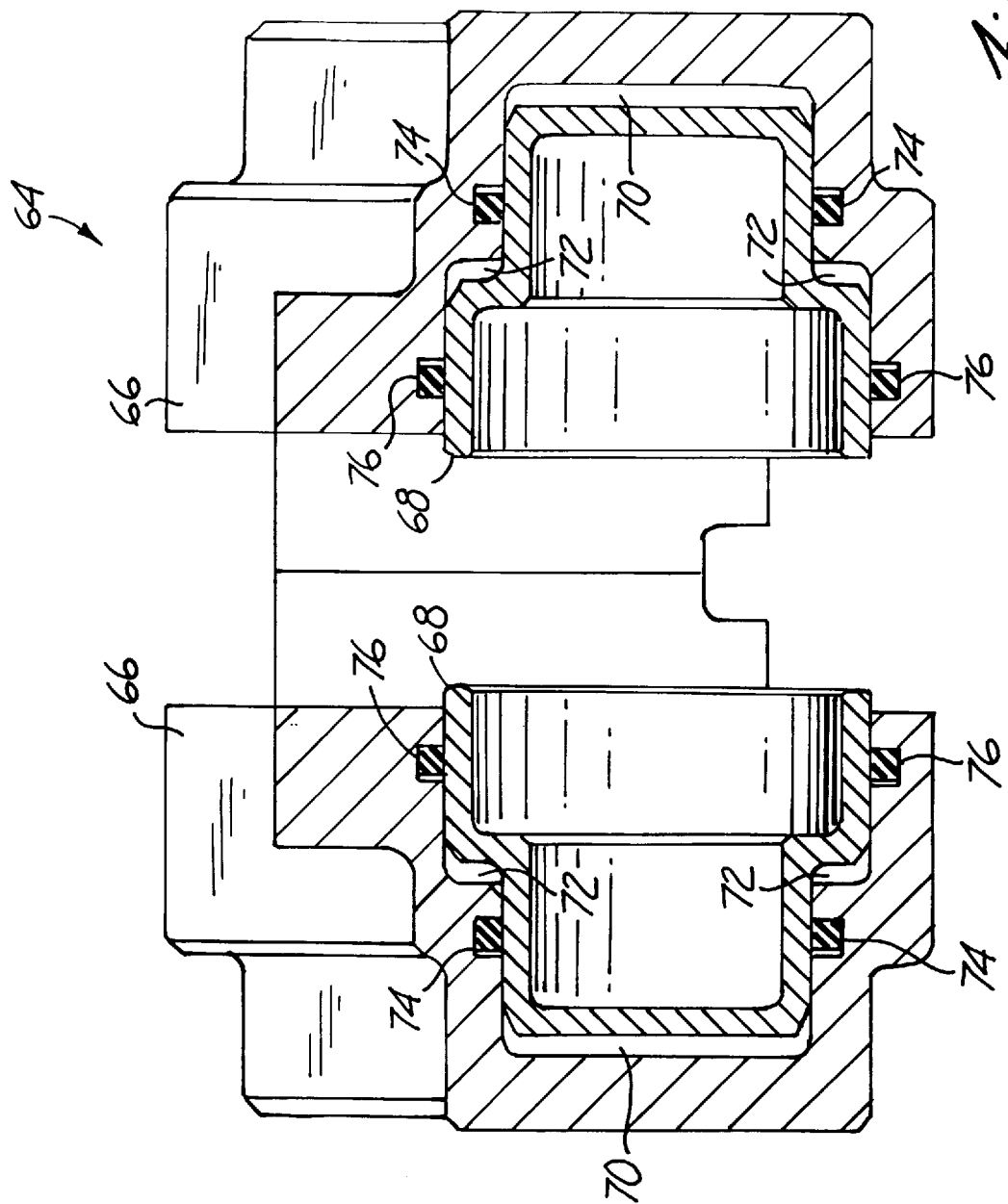
FIG. 4 is a cross-sectional view of a rear caliper of the dual-hydraulic brake system of the invention.

Details of the construction of a preferred rear brake caliper 64 are illustrated in FIG. 4. This preferred brake caliper 64 includes a pair of stepped pistons 68 located on opposite sides of the rotor. Although Applicants prefer to use two opposed, stepped pistons 68 when a single caliper is rigidly attached to the chassis 10 to brake both rear wheels 14, only a single stepped piston 68 is required (and only a single piston 68 would typically be used if the rear caliper were of the floating type—i.e., attached to the chassis using a pair of pins which allow the caliper to float side to side to automatically self-center itself). Each stepped piston 68 is received in a complimentary stepped bore formed in the caliper body 66. Each stepped piston 68 and its associated stepped bore together define first and second hydraulic fluid chambers 70 and 72, respectively, the second hydraulic fluid chamber 72 being generally annular in shape. The first and second chambers 70 and 72 are sealed from each other by an intermediate seal 74, and the second chamber 72 is also sealed by a front seal 76. Such seals may be O-rings or any other type of conventional piston seals.

The first hydraulic fluid chambers 70 are connected to the first set of hydraulic lines 36 so that when the hand-operable brake lever 30 actuates the first master cylinder 32 hydraulic fluid forces the stepped pistons 68 toward the rotor 62, thereby braking the rear wheels 14 of the ATV along with the front wheels 12. The second hydraulic fluid chambers 72 are connected to the second set of hydraulic lines 88 so that when the foot-operable brake lever 82 actuates the second master cylinder 80 hydraulic fluid again forces the stepped pistons 68 toward the rotor 62, thereby braking the rear wheels 14 of the ATV. Because the second hydraulic fluid chambers 72 are sealed from the first hydraulic fluid chambers 70, actuation of the second master cylinder 80 brakes the rear wheels of the ATV without actuating the front brake units 40 and 50.

FIG. 3 shows an alternate embodiment of the dual hydraulic brake system of the invention. In this embodiment the foot-operated brake lever 82, the second master cylinder 80 (along with its reservoir 86) and the mechanical linkage 84 between the lever 82 and the second master cylinder 80 have been replaced by a handlebar mounted brake lever 90 and associated master cylinder 92 and hydraulic fluid reservoir 94. Typically such a handlebar mounted brake lever 90 for the rear wheels would be mounted adjacent to the right handlebar grip for operation by the rider's right hand.

While a preferred embodiment of the present invention has been described, it should be understood that various changes, adaptations and modifications may be made therein without departing from the spirit of the invention and the scope of the appended claims.

What is claimed is:

1. An all terrain vehicle comprising:
    a chassis carrying a straddle-type seat which is sufficiently narrow to be straddled by a rider;
    a pair of front wheels mounted to the chassis, and handlebars connected to the front wheels for steering the vehicle;
    a pair of rear wheels mounted to the chassis;
    a laterally extending footrest on each side of the chassis;
    an engine carried by the chassis, the engine being connected to a drive train supplying motive power to at least some of the wheels; and
    a dual hydraulic brake system including:
        a first master cylinder, a pair of front hydraulic brake units, each front brake unit being associated with one of the front wheels, a rear brake unit associated with the rear wheels, a first hand-operable brake lever mounted to the handlebars and operatively connected to the first master cylinder, and hydraulic connections among the first master cylinder and the brake units so that when the first brake lever actuates the first master cylinder all three brake units are actuated to brake both the front wheels and the rear wheels; and a second master cylinder, a second brake lever operatively connected to the second master cylinder, and a hydraulic connection between the second master cylinder and only the rear brake unit so that operation of the second brake lever actuates the second master cylinder which in turn actuates only the rear brake unit to brake the rear wheels, the hydraulic connections between the first master cylinder and the rear brake unit being separate from, and sealed from, the hydraulic connections between the second master cylinder and the rear brake unit.

2. The all terrain vehicle of claim 1 wherein the rear brake unit includes a brake caliper having a caliper body and a stepped piston disposed within a stepped bore formed in the caliper body.

3. The all terrain vehicle of claim 2 wherein the stepped piston and the stepped bore together define two hydraulic fluid chambers, a first chamber hydraulically connected to the first master cylinder, and a second chamber hydraulically connected to the second master cylinder.

4. The all terrain vehicle of claim 3 further comprising a hydraulic fluid seal disposed between the two hydraulic fluid chambers.

5. The all terrain vehicle of claim 1 wherein the rear brake unit includes a brake caliper having a caliper body and a pair of opposed stepped pistons disposed respectively within a pair of opposed stepped bores formed in the caliper body.

6. The all terrain vehicle of claim 1 wherein each of the front hydraulic brake units comprises a disc brake rotor carried by the associated wheel, and a disc brake caliper positioned to selectively engage the rotor.

7. The all terrain vehicle of claim 1 wherein the rear brake unit comprises a disc brake rotor rotatable with the rear wheels, and a disc brake caliper positioned to selectively engage the rotor.

8. The all terrain vehicle of claim 7 wherein the rear disc brake caliper includes a caliper body and left and right caliper slave cylinders, each cylinder being comprised of a stepped piston disposed within a stepped bore formed in the caliper body, the slave cylinders being generally aligned with each other on opposite sides of the rotor.

9. The all terrain vehicle of claim 8 wherein the stepped piston and the stepped bore of each slave cylinder together define a pair of hydraulic fluid chambers in such slave cylinder, a first chamber hydraulically connected to the first master cylinder, and a second chamber hydraulically connected to the second master cylinder.

10. The all terrain vehicle of claim 9 further comprising a hydraulic fluid seal disposed between the two hydraulic fluid chambers of each slave cylinder.

11. The all terrain vehicle of claim 7 wherein the rear wheels are connected to a common drive axle, the rotor being carried by the axle.

12. The all terrain vehicle of claim 1 further comprising first and second separate hydraulic fluid reservoirs associated respectively with the first and second master cylinders.

13. An all terrain vehicle comprising:
a chassis;
a pair of front wheels mounted to the chassis;
a pair of rear wheels mounted to the chassis;
an engine carried by the chassis, the engine being connected to a drive train supplying motive power to at least some of the wheels; and a dual hydraulic brake system including:
a first master cylinder, a pair of front hydraulic brake units, each front brake unit being associated with one of the front wheels, a rear brake unit associated with the rear wheels, a first hand-operable brake lever operatively connected to the first master cylinder, and a first set of hydraulic connections among the first master cylinder and the brake units so that when the first brake lever actuates the first master cylinder all three brake units are actuated to brake both the front wheels and the rear wheels; and a second master cylinder, a second brake lever operatively connected to the second master cylinder, and a second set of hydraulic connections between the second master cylinder and only the rear brake unit, the second set of hydraulic connections being separate from and sealed from the first set of hydraulic connections so that actuation of the second master cylinder by the second brake lever actuates only the rear brake unit to brake the rear wheels independently of the front wheels.

14. An all terrain vehicle comprising:
a chassis carrying a straddle-type seat which is sufficiently narrow to be straddled by a rider;
a pair of front wheels mounted to the chassis, and handlebars connected to the front wheels for steering the vehicle;
a pair of rear wheels connected to a common rear drive axle mounted to the chassis;
a laterally extending footrest on each side of the chassis;
an engine carried by the chassis generally beneath the straddle-type seat and generally between the footrests, the engine being connected to a drive train supplying motive power to at least some of the wheels; and
a dual hydraulic brake system including:
a first master cylinder,
a first hydraulic fluid reservoir associated with the first master cylinder,
a hand-operable brake lever mounted to the handlebars and operatively connected to the first master cylinder,
a second master cylinder,
a second hydraulic fluid reservoir associated with the second master cylinder,
a foot-operable brake lever carried by the chassis near one of the footrests and operatively connected to the second master cylinder,
a pair of front hydraulic disc brake units, each front disc brake unit being associated with one of the front wheels and including a rotor carried by such wheel and a disc brake caliper positioned to selectively engage such rotor,
a rear disc brake unit including a rear disc brake rotor carried by the rear drive axle and a rear disc brake caliper positioned to selectively engage the rear disc brake rotor, the rear disc brake caliper including a caliper body and a stepped piston disposed within a stepped bore formed in the caliper body, the stepped piston and the stepped bore together defining first and second hydraulic fluid chambers, the first and second chambers being sealed from each other,
a first set of hydraulic connections among the first master cylinder, the front brake units and the first hydraulic fluid chamber of the rear brake unit so that when the hand-operable brake lever actuates the first master cylinder all three brake units are actuated to brake both the front wheels and the rear wheels; and a second set of hydraulic connections between the second master cylinder and the second hydraulic fluid chamber of the rear brake unit, the first set of hydraulic connections being separate from, and sealed from, the second set of hydraulic connections so that when the foot-operable brake lever actuates the second master cylinder the rear brake unit is actuated without actuating the front brake units, thereby braking the rear wheels independently of the front wheels.

15. An all terrain vehicle comprising:

a chassis carrying a straddle-type seat which is sufficiently narrow to be straddled by a rider;

a pair of front wheels mounted to the chassis, and handlebars connected to the front wheels for steering the vehicle;

a pair of rear wheels connected to a common rear drive axle mounted to the chassis;

a laterally extending footrest on each side of the chassis;

an engine carried by the chassis generally beneath the straddle-type seat and generally between the footrests, the engine being connected to a drive train supplying motive power to at least some of the wheels; and a dual hydraulic brake system including:
   a first master cylinder,
   a first hydraulic fluid reservoir associated with the first master cylinder,
   a first hand-operable brake lever mounted to the handlebars and operatively connected to the first master cylinder,
   a second master cylinder,
   a second hydraulic fluid reservoir associated with the second master cylinder,
   a second hand-operable brake lever carried by the chassis near one of the footrests and operatively connected to the second master cylinder,
   a pair of front hydraulic disc brake units, each front disc brake unit being associated with one of the front wheels and including a rotor carried by such wheel and a disc brake caliper positioned to selectively engage such rotor,
   a rear disc brake unit including a rear disc brake rotor carried by the rear drive axle and a rear disc brake caliper positioned to selectively engage the rear disc brake rotor, the rear disc brake caliper including a caliper body and a stepped piston disposed within a stepped bore formed in the caliper body, the stepped piston and the stepped bore together defining first and second hydraulic fluid chambers, the first and second chambers being sealed from each other,
   a first set of hydraulic connections among the first master cylinder, the front brake units and the first hydraulic fluid chamber of the rear brake unit so that when the first brake lever actuates the first master cylinder all three brake units are actuated to brake both the front wheels and the rear wheels; and
   a second set of hydraulic connections between the second master cylinder and the second hydraulic fluid chamber of the rear brake unit, the first set of hydraulic connections being separate from, and sealed from, the second set of hydraulic connections so that when the second brake lever actuates the second master cylinder the rear brake unit is actuated without actuating the front brake units, thereby braking the rear wheels independently of the front wheels.

* * * * *